United States Patent Office 3,352,707
Patented Nov. 14, 1967

3,352,707
GLASS HAVING DUAL PROTECTIVE COATINGS THEREON AND METHOD FOR FORMING SUCH COATINGS
John Edward Pickard, Selma, Ind., assignor to Ball Brothers Company Incorporated, Muncie, Ind., a corporation of Indiana
No Drawing. Filed Jan. 31, 1964, Ser. No. 341,739
19 Claims. (Cl. 117—72)

ABSTRACT OF THE DISCLOSURE

Method for treating glass by forming two coatings thereon, the first coating being a tin oxide coating produced by exposing heated virgin glass to a heat decomposable tin compound, and the second coating being a substantially water-insoluble polyvinyl alcohol-based coating formed on the tin oxide coating after annealing, and an article produced by the method.

---

The present invention relates to a new and improved permanent, lubricous coating for glass and more particularly relates to an improved combination of coatings for glass articles such as glassware, and relates to a novel method of forming such a combination of coatings on glass.

Glass articles such as glassware, are handled a great number of times during manufacture, inspection, shipping, filling, use, etc. During such handling, the ware comes into contact with various mechanical devices such as feeders, conveyors, inspection devices and the like and also contacts other pieces of ware and surfaces such as boxes, shelves, etc.

This high degree of contact causes damage either by breakage, cracking, scratching or other defacing of the surface thereof. Breakage during processing creates a serious problem in that a processing line may jam which requires attention by a person, e.g., to clean the broken ware from the line. The possibility of interruption of a line due to breakage of ware necessitates a higher degree of supervision than may actually be required. Breakage during processing is also serious because of the possibility of slivers or fragments of the shattered glass being deposited in adjacent ware which is undesirable in most situations and is completely unacceptable when the ware is to be used for food packaging.

Attempts have been made in the past to minimize or eliminate the above difficulties by the application of various coatings to glass. While the coatings proposed, in some cases, have reduced breakage and other damage to some degree, the coatings have created other problems. In some cases it has been difficult to apply the coating composition to the ware, the coatings have colored the glass and/or labels did not tightly adhere to the coated surfaces. Other coatings did not retain lubricity after washing or steam cleaning and thus were unsuccessful. Many coatings were not acceptable because they had not been approved for use in food. Thus, none of the coatings proposed provided the desired combination of improved properties.

In view of the above and other difficulties and problems with coatings for glass heretofore employed, it was completely unexpected and surprising to discover a new and improved combination of coatings for glass which overcomes many of the problems encountered in the past and, in addition, provides benefits and advantages heretofore unattainable. The coating combination of the present invention provides a permanent lubricous surface on glass which reduces damage during handling to a minimum and which does not lose its lubricity when cleaned with hot water or steam. Furthermore, the combination provides a surface to which labels adhere tightly even after extended periods of storage and handling. Moreover, the method of coating glass surfaces in accordance with the invention is simple and convenient and relatively low in cost. Another advantage of the coating combination of the invention is that the appearance of the glass is not changed. Moreover, the coating compositions employed to form the novel combination of coatings of the invention are readily formulated and easily applied to glass surfaces.

In accordance with the present invention, glass having a high degree of lubricity and a substantial improvement in strength is formed by applying a decomposable tin compound to virgin glass which still retains a portion of its heat of formation and subsequently applying a polyvinyl alcohol-containing mixture thereto and heating the article to an elevated temperature. The glass article so produced has a tin oxide coating which is believed to be chemically bonded to the virgin surface of the glass and an outer coating of a polyvinyl alcohol reaction product. Virgin glass or glass in a virgin state is newly-formed glass which has not been annealed or had an opportunity to be adversely affected by the elements.

The tin compound is applied to the virgin glass while the glass is at a temperature above the decomposition temperature of the tin compound but below the solidification temperature of the glass. Advantageously, the glass is between about 900° and 1500° F. and preferably between about 1050° and 1300° F. during treatment.

The decomposable tin compound may be either inorganic or organic in nature, for example, an inorganic salt such as a tin halide or an organic tin compound such as an alkyl or aryl tin, an alkyl or aryl tin salt, etc. Particularly useful are tin compounds such as stannous chloride, stannic chloride, stannous fluoride, diethyl isobutyl tin, dipropyl tin dibromide, etc.

The decomposable tin compound may be dissolved or dispersed in water or an organic solvent prior to application or may be applied as a vapor. Suitable organic solvents for use in forming a coating composition include aromatic solvents, e.g., benzene, xylene, etc.; aliphatic solvents, e.g., ethyl alcohol, methylethyl ketone, etc.; cycloaliphatic solvents, e.g., cyclohexane, etc.; and derivatives of such compounds, e.g., nitrobenzene. Advantageously, the composition is an aqueous solution.

Other materials may be combined with the tin compound provided they do not adversely affect the benefits and advantages of the invention. For example, it is advantageous to employ an acid such as hydrochloric acid in an aqueous stannous chloride coating composition. Other materials which may be employed include stabilizers, emulsifying or dispersing agents and the like.

The proportion of the tin compound in the coating composition may vary considerably depending on the weight of the tin present in the compound. For example, when employing stannous chloride the concentration of the tin salt is advantageously between about 0.5% and 15% by weight of the composition. Thus, the proportion of tin in the composition would be between about 0.3% and 10%. Similar proportions also are useful with other organic and inorganic tin compounds.

When an aqueous stannous chloride solution is employed, it is advantageous to incorporate about 0.5% and 6% by weight of hydrochloric acid in the solution.

The tin compound advantageously is sprayed, atomized or vaporized onto the hot glass surface. Preferably, the tin compound is applied in a partially enclosed area with an exhaust to remove any undesirable fumes.

The polyvinyl alcohol employed in the second coating composition of the invention advantageously is a substantially completely hydrolyzed polymer, that is, a polymer with less than about 5% by weight of residual acetate groups and a saponification number of less than about 40. Preferably, the polyvinyl alcohol has less than about 1% residual acetate groups and a saponification number of less than about 20.

The polyvinyl alcohol is advantageously combined with other materials which react with the polyvinyl alcohol to form substantially water-insoluble coatings. For example, insolubilizers and plasticizers may be combined with the polyvinyl alcohol. In addition, various other polymers such as polyolefins may be employed with the polyvinyl alcohol. Examples of suitable combinations include mixtures of polyvinyl alcohol, ammonium chloride and a polyhydroxy compound such as glycerin or a polyalkylene glycol; mixtures of polyvinyl alcohol, a polyolefin such as polyethylene and an organic or inorganic acid or salt, e.g., a relatively strong mineral acid such as phosphoric, hydrochloric, chromic acid, etc.; an aliphatic acid such as carbonic, oxalic, malonic, chloroacetic acid, etc.; ammonium chloride; and the like.

The concentration of the polyvinyl alcohol in the coating composition is advantageously between about 0.001% and 5% by weight of the composition and preferably between about 0.05% and 0.2% thereof. Although, compositions containing proportions of polyvinyl alcohol outside the preferred range produce benefits and advantages of the invention, the lower concentrations tend to form very thin coatings which are less desirable because of the number of coats required, while higher concentrations tend to produce compositions of higher viscosity which make it more difficult to form a smooth, uniform coating.

The proportions of the other components in the composition may vary widely although the polyvinyl alcohol will comprise a substantial proportion of the active ingredients present in the composition. For example, the insolubilizer advantageously comprises between about 1 and 40% by weight of the polyvinyl alcohol and the plasticizer between about 3% and 50% of the polyvinyl alcohol. Similarly a polyolefin having a molecular weight between about 1000 and 3000 advantageously comprises between about 40% and 90% by weight of the polyvinyl alcohol and the acid or salt between about 80% and 300% by weight of the polyvinyl alcohol.

In addition to the principal components of the polyvinyl alcohol coating composition as set forth above, other materials may be included therein provided they do not deleteriously affect the improved properties and characteristics of the coating. For example, a pigment may be incorporated in the coating composition and dispersing or emulsifying agents may be employed to facilitate mixing of the components of the coating composition. In addition, it may be desirable to improve the "shelf life" of the composition by incorporating stabilizers, bactericides, mold inhibitors or similar materals.

The polyvinyl alcohol composition may be applied to the glass by any convenient method and preferably by spraying or atomizing. Advantageously, the composition is applied to the glass at an elevated temperature, e.g., above about 160° F. Coating of the glass may be conveniently accomplished as the glass emerges from the cold end of an annealing lehr. However, if desired, the composition may be applied to cold glass either before or during reheating thereof.

The maximum temperature to which the polyvinyl alcohol coating is exposed to complete the required reactions is not critical but is limited only by the temperature which causes the glass to thermo-check, that is, cracking or crazing of the surface. Preferably, the coating is heated to a temperature in the range of about 180° to 500° F.

The invention will be described in detail with reference to the following examples. It is intended that the examples be illustrative of the invention and not limiting the invention to the specific procedures and conditions set forth. In the examples, parts and percentages are by weight.

*Example I*

A 5% solution of stannous chloride in water containing about 1% hydrochloric acid was sprayed onto a series of 5-ounce baby food jars as they passed from a forming machine to an innealing lehr. The spraying was done at an air pressure of about 40 p.s.i. in an enclosed area with a hood to exhaust any objectionable fumes. The temperature of the jars during coating was approximately 1100° F.

After being coated the jars were passed through the annealing lehr and then coated with a polyvinyl alcohol composition prepared as follows: Eight parts of molten polyethylene having a molecular weight of about 2500 were mixed with about 1 part of polyvinyl alcohol containing less than about 1% of residual acetate groups and having a saponification number of about 12, 2 parts by weight of polyoxyethylene sorbitan monostearate and about 20 parts of boiling water. The mixture was agitated thoroughly and then added to about 11 parts of the above polyvinyl alcohol dissolved in about 200 parts of hot water. Ten parts of the above mixture were then diluted with about 590 parts of water and 0.7 part of concentrated phosphoric acid (85%).

The resulting composition containing about 0.08% polyvinyl alcohol, 0.07% polyethylene, and 0.1% phosphoric acid, was sprayed onto a series of 5-ounce glass baby food jars as the jars emerged from the annealing lehr. The jars were at a temperature of about 200° F. The coated jars were allowed to cool slowly while maintaining a temperature above about 160° F. for about 1 minute.

Samples of the coated jars were selected and control samples were also selected from uncoated jars which were made immediately preceding and succeeding the coated jars. The coated jars had a coefficient of friction of about one-fifth that of similar uncoated jars. The jars were also tested to determine the impact strength and it was found that the coated jars had an impact strength 10–15% greater than that of the uncoated jars. Labels were applied to samples of the coated jars and found to adhere tightly even after steam treatment for about 20 minutes.

The jars were used in a processing line in which each jar was filled with baby food and processed in a steam cooker at 210° F. for approximately 10 minutes. The jars moved through the line at a rate of more than 500 per minute. No jamming of the processing line occurred with the coated jars, while approximately one jam per minute due to breakage or falling down of jars occurred with uncoated jars processed in a similar manner.

The coefficient of friction of the coated and uncoated jars after processing was checked again, and it was found that the coated jars retained the same coefficient of friction as before processing.

*Example II*

The procedure of this example was the same as that of Example I, except that a 5% aqueous stannous fluoride solution was employed in place of the stannous chloride solution. Coated glass jars showed superiorities over uncoated jars similar to those exhibited by the coated jars of Example I.

*Example III*

The procedure of this example was the same as that of Example I, except that the polyvinyl alcohol coating composition contained about 0.1% polyvinyl alcohol having less than about 1% of residual acetate groups and a saponification number of about 15, 0.01% ammonium chloride and 0.015% glycerin.

The coated jars were tested according to the procedures of Example I and found to show the improvements and advantages exhibited by the coated jars of Example I.

*Example IV*

The procedure of this example was the same as that of Example I, except that a 5% solution of dipropyl tin dibromide in isopropyl alcohol was employed in place of the stannous chloride solution. Coated jars exhibited the superiorities and advantages shown by the coated jars of Examples I, II, and III.

*Example V*

The procedure of this example was the same as that of Example I, except that the polyvinyl alcohol coating composition contained 0.1% chloroacetic acid in place of the phosphoric acid. Coated jars exhibited improved lubricity and strength similar to the coated jars of Example I.

The above description and examples show that the present invention provides a novel permanent coating for glass which has a high degree of lubricity that withstands treatment with hot water or steam. Furthermore, the strength of the coated glass is substantially greater than that of uncoated glass. Another advantage of the coating of the invention is that the above improvements are achieved without significantly changing the appearance of the glass and without adversely affecting the labeling characteristics of the glass. In addition, the method of the invention for forming the coatings on glass is simple and convenient, and relatively low in cost. Further, the coating compositions of the invention are easily formulated and can be readily applied to glass surfaces.

It will be apparent from the above description that various modifications may be made in the compositions and procedures described within the scope of the invention. Therefore, the invention is not intended to be limited to the particular formulations and procedures described except as many be required by the following claims.

What is claimed is:

1. A coated glass article of improved strength and lubricity having a tin oxide coating adhered directly to a surface of said glass article and a substantially water-insoluble polyvinyl alcohol coating on said tin oxide coating.

2. A glass article of improved strength and lubricity having a plurality of coatings, the first of said coatings comprising tin oxide adhered directly to the glass article and the second of said coatings comprising a substantially water-insoluble polyvinyl alcohol reaction product adhered to said tin oxide coating.

3. A glass article as described in claim 2 in which the coating of substantially water-insoluble polyvinyl alcohol reaction product includes a polyolefin.

4. A glass article as described in claim 3 in which said polyolefin is polyethylene.

5. A glass article as described in claim 2 in which said polyvinyl alcohol reaction product comprises the reaction product of polyvinyl alcohol, ammonium chloride and a polyhydroxy compound.

6. A glass article as described in claim 5 wherein said polyhydroxy compound is selected from the group consisting of glycerin and polyalkylene glycols.

7. A coated glass article comprising a surface of said glass article having thereon a tin oxide coating, and a second water-insoluble coating on said tin oxide coating, said second coating comprising the reaction product of polyvinyl alcohol having not more than 5% residual acetate groups and an insolubilizing agent.

8. An article as described in claim 7 wherein said insolubilizing agent is selected from the group consisting of inorganic and organic acids and salts.

9. A method of forming a glass article of improved strength and lubricity which comprises forming a tin oxide coating on said glass article by applying a heat decomposable tin compound to a virgin glass article at a temperature above the decomposition temperature of the tin compound, completing the annealing of the tin oxide-coated article, applying to the tin oxide-coated surface a polyvinyl alcohol-containing mixture comprising polyvinyl alcohol having not more than 5% residual acetate groups and an insolubilizing agent, and heating the polyvinyl alcohol coating to an elevated temperature to form a substantially water-insoluble polyvinyl alcohol coating.

10. A method as described in claim 9 in which said decomposable tin compound is a tin chloride compound.

11. A method as described in claim 9 wherein said decomposable tin compound is stannic chloride and is applied to said virgin glass article as a vapor.

12. A method as described in claim 9 wherein said decomposable tin compound is stannous chloride and is applied to the virgin glass article as an aqueous solution.

13. A method as described in claim 9 wherein said decomposable tin compound is applied to said virgin glass article at a temperature above 900° F.

14. A method as described in claim 9 wherein said polyvinyl alcohol-containing mixture is applied to said tin oxide coated surface at a temperature between about 160° F. and 500° F.

15. A method of forming an improved glass article comprising applying a heat decomposable compound of tin chloride to a virgin glass article at a temperature above about 900° F. to form a tin oxide coating, annealing said coated article, applying to said tin oxide coated surface a mixture containing between about 0.001% and 5% by weight of polyvinyl alcohol having no more than 5% residual acetate groups and an insolubilizing agent, and heating said second coating to a temperature between about 160° F. and 500° F.

16. A method as described in claim 15 wherein said insolubilizing agent is selected from the group consisting of inorganic and organic acids and salts.

17. A method of forming an improved glass article comprising applying a vapor of stannic chloride to a virgin glass article at a temperature above about 900° F. to form a tin oxide coating, annealing said coated article, applying to said tin oxide coated surface a mixture containing between about 0.001% and 5% by weight of polyvinyl alcohol having no more than 5% residual acetate group and an insolubilizing agent, and heating said second coating to a temperature between about 160° F. and 500° F. to form a substantially water-insoluble coating.

18. A method as described in claim 17 wherein said insolubilizing agent is selected from the group consisting of inorganic and organic acids and salts.

19. A method as described in claim 17 wherein said polyvinyl alcohol contains no more than 1% residual acetate groups.

References Cited

UNITED STATES PATENTS

| | | | |
|---|---|---|---|
| Re. 25,767 | 4/1965 | Auffenorde et al. | 117—124 X |
| 2,211,323 | 8/1940 | Fordyce | 117—161 X |
| 2,577,936 | 12/1951 | Waggoner | 117—72 |
| 2,595,800 | 5/1952 | McGraw et al. | 117—72 X |
| 2,903,377 | 9/1959 | Saulnier | 117—72 X |
| 3,019,135 | 1/1962 | Orr | 117—211 |
| 3,033,842 | 5/1962 | Holtschmidt | 117—124 |
| 3,085,910 | 4/1963 | Sexsmith | 117—72 X |
| 3,141,003 | 7/1964 | Neros et al. | 117—124 X |
| 3,199,966 | 8/1965 | O'Connell et al. | 65—60 X |

WILLIAM D. MARTIN, *Primary Examiner.*

R. HUSACK, *Assistant Examiner.*